(12) United States Patent
Choi

(10) Patent No.: US 12,109,930 B2
(45) Date of Patent: Oct. 8, 2024

(54) HEATING AND COOLING CUP HOLDER FOR VEHICLE

(71) Applicant: NIFCO KOREA INC., Chungcheongnam-do (KR)

(72) Inventor: Gi Seung Choi, Gyeonggi-do (KR)

(73) Assignee: NIFCO KOREA INC., Chungcheongnam-do (KR)

( * ) Notice: Subject to any disclaimer, the term of this patent is extended or adjusted under 35 U.S.C. 154(b) by 277 days.

(21) Appl. No.: 17/629,089

(22) PCT Filed: Jul. 9, 2020

(86) PCT No.: PCT/KR2020/008997
§ 371 (c)(1),
(2) Date: Jan. 21, 2022

(87) PCT Pub. No.: WO2021/015457
PCT Pub. Date: Jan. 28, 2021

(65) Prior Publication Data
US 2022/0242294 A1 Aug. 4, 2022

(30) Foreign Application Priority Data
Jul. 22, 2019 (KR) .......................... 10-2019-0088315

(51) Int. Cl.
*B60N 3/10* (2006.01)
*F25B 21/02* (2006.01)

(52) U.S. Cl.
CPC .............. *B60N 3/104* (2013.01); *F25B 21/02* (2013.01); *F25B 2321/0211* (2013.01)

(58) Field of Classification Search
CPC .. B60N 3/104; F25B 21/02; F25B 2321/0211; F25B 21/04; F25B 2321/023
See application file for complete search history.

(56) References Cited

U.S. PATENT DOCUMENTS

| | | | |
|---|---|---|---|
| 5,720,171 A | 2/1998 | Osterhoff et al. | |
| 2015/0175046 A1* | 6/2015 | Oh .......................... | B60N 3/104 62/3.61 |
| 2019/0162460 A1* | 5/2019 | Oh .......................... | F25B 21/02 |

FOREIGN PATENT DOCUMENTS

| | | | |
|---|---|---|---|
| CN | 103799887 A | | 5/2014 |
| CN | 105555603 A | | 5/2016 |

(Continued)

OTHER PUBLICATIONS

State Intellectual Property Office, First Notice of Examination Action dated Jan. 26, 2024, Application No. CN 202080052449.6, 7 pages.

*Primary Examiner* — Ana M Vazquez
(74) *Attorney, Agent, or Firm* — Stinson LLP

(57) ABSTRACT

A heating and cooling cup holder for vehicles includes a heat insulating cup where a container accommodating part is formed with an upper part opened so that a beverage container can be accommodated, a heat exchange cup installed in the container accommodating part formed in the heat insulating cup, a circulation duct installed so that an air suction port and an air exhaust port are formed in the heat exchange cup, a circulation fan circulates and introduces air into the heat exchange cup through the air suction port and the air exhaust port formed in the circulation duct, a radiation plate heat-exchanging the air introduced into the heat exchange cup by the circulation fan to re-supply to the heat exchange cup through the circulation duct, and a thermoelectric element installed so that the radiation plate can absorb and generate heat.

2 Claims, 3 Drawing Sheets

(56) References Cited

FOREIGN PATENT DOCUMENTS

| | | | |
|---|---|---|---|
| CN | 106166976 | A | 11/2016 |
| CN | 109838956 | A | 6/2019 |
| KR | 200377824 | Y1 | 3/2005 |
| KR | 1014492930000 | B1 | 10/2014 |
| KR | 1020150075964 | A | 7/2015 |
| KR | 1020160036448 | A | 4/2016 |
| KR | 1018738570000 | B1 | 7/2018 |

\* cited by examiner

HEATING AND COOLING CUP HOLDER FOR VEHICLE

CROSS-REFERENCE TO RELATED APPLICATIONS

This application is a national stage application of PCT/KR2020/008997, filed Jul. 9, 21020, which claims priority to Korean application 10-2019-0088315, filed Jul. 22, 2019, the entire contents of which are incorporated herein by reference for all purposes.

TECHNICAL FIELD

The present invention relates to a heating and cooling holder for vehicles, and more particularly, to a heating and cooling holder for vehicles that can increase the efficiency of transferring heat to the beverage in a cup holder, so that hot and cold beverages can be made fast for consumption.

BACKGROUND

A cup holder is installed inside a car so that a driver or a passenger can place a cup or beverage container in it.

This cup holder generally only has a simple holding function, but depending on the vehicle model, cup holders that have both cooling and heating functions are also installed.

However, the conventional heating and cooling cup holder for vehicles have a problem in that they cannot sufficiently perform heating or cooling because they simply perform heating or cooling using only heat conduction.

Therefore, in the prior art, in order to solve the above problem, a Peltier element is used to heat or cool the accommodated cup by just transferring heat to a cup holder body through conduction.

However, this technology has a problem in that when the contact area between the cup and the cup holder is small, the cooling and heating based on the heat conduction does not function properly.

That is, the size of the cup and the cup holder do not always match, and some cups have deep concave bottom surfaces. In the case of paper cups with low thermal conductivity, the cup temperature tends to coincide with the surrounding temperature because heat transfer due to conduction hardly occurs.

Therefore, there was a need for a cup holder that can properly perform the actual function of heating and cooling by solving this problem.

In addition, U.S. Pat. No. 5,720,171 B 1, entitled "Device for heating and cooling a beverage," also suggests a cup holder, but this also has a problem in that its actual cooling and heating efficiency is very low because it also realizes cooling and heating by conduction only.

The matters described as the background art above are only for improving the understanding of the background of the present invention, and should not be taken as acknowledging that they correspond to the prior art already known to those of ordinary skill in the art.

SUMMARY

An object of the present invention, which is devised to solve the problems of the related art as described above, is to provide a heating and cooling cup holder for vehicles that allows you to quickly prepare a cold drink or a hot drink in a vehicle for consumption, where air that has absorbed or discharged heat because it came in contact with a thermoelectric element of a radiation plate is supplied to a heat exchange cup through an air suction port of a circulation duct, and the air that has undergone heat exchange with the beverage contained in a container or cup after supplied to the heat exchange cup flows into the radiation plate through the air exhaust port of the circulation duct and is re-supplied to the heat exchange cup while heat exchange is made after introduced to the radiation plate via the air exhaust port of the circulation duct and at the same time, the heat exchange cup also exchanges heat with the beverage in a container or a cup by heat transfer to the heat radiation plate.

The above object is achieved by the present invention being comprised of a heat insulating cup 100 in which a container accommodating part 110 is formed with an upper part opened so that a beverage container can be accommodated, a heat exchange cup 200 installed in the container accommodating part 110 formed in the heat insulating cup 100, a circulation duct 300 installed so that an air suction port 310 and an air exhaust port 320 are formed in the heat exchange cup 200, a circulation fan 700 that circulates air while introducing air into the heat exchange cup 200 through the air suction port 310 and the air exhaust port 320 formed in the circulation duct 300, a radiation plate 400 heat-exchanging the air introduced into the heat exchange cup 200 by the circulation fan 700 to re-supply to the heat exchange cup 200 through the circulation duct 300, and a thermoelectric element 600 installed so that the radiation plate 400 can absorb and generate heat.

Meanwhile, a radiation fan 800 for discharging heat to the outside is installed at the radiation plate 400 where the thermoelectric element 600 is installed, so when the radiation plate 400 absorbs heat by the thermoelectric element 600, it is more preferable to allow the radiation plate 400 to absorb heat while effectively discharging heat to the outside.

In addition, we would like to make it clear that the radiation plate 400 is installed in the heat insulating cup 100 in a state where it is fixedly coupled to a radiation duct 500 where a radiation fan 800 is installed on one side, so the radiation plate 400 is not moved due to external force generated when the vehicle is in operation, maintaining the state of fixed installation, and at the same time, air is sufficiently conditioned through a heat exchange fin 410 installed inside the radiation plate 400.

Meanwhile, we would like to make it clear that it is more preferable to install a cover 900 on the upper part of the heat insulating cup 100 where the heat exchange cup 200 is installed, so that the circulation duct 300 and the circulation fan 700 installed in the heat exchange cup 200 are not visible from the outside.

According to the present invention, performance is maximized in preserving beverages in a refrigerated or warm state, compared to conventional refrigerators, and thermal efficiency is improved by recycling heat without discharging it to the outside of the cup holder, thereby increasing the user's convenience and the commercial value as well, because it is possible to quickly heat or cool a beverage in a car for consumption.

DETAILED DESCRIPTION

Hereinafter, the technical configuration of the present invention will be described in detail with reference to the accompanying drawings.

Figure 1:
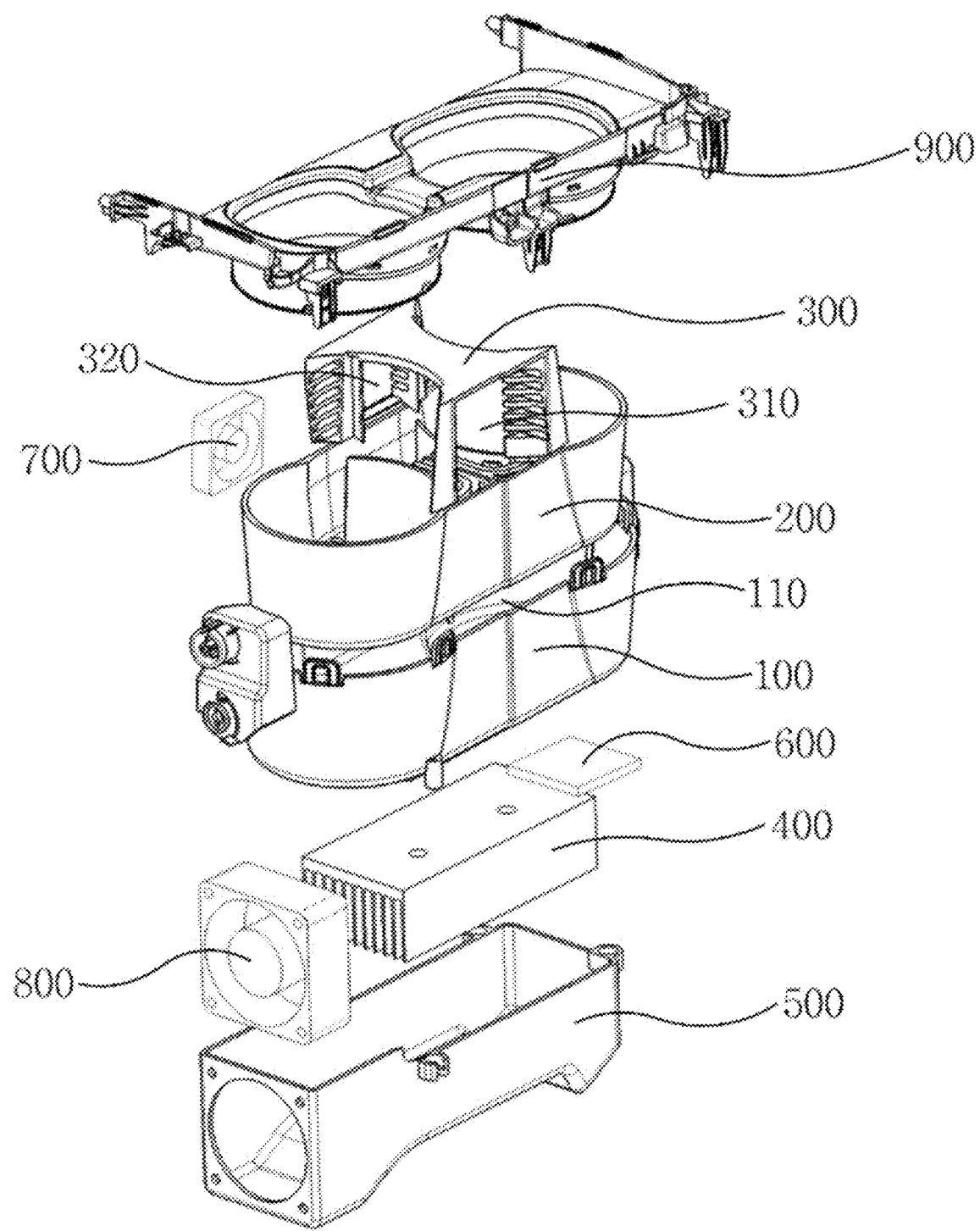
FIG. 1 is an exploded perspective view showing the configuration of a heating and cooling holder for vehicles according to the present invention.
Figure 2:
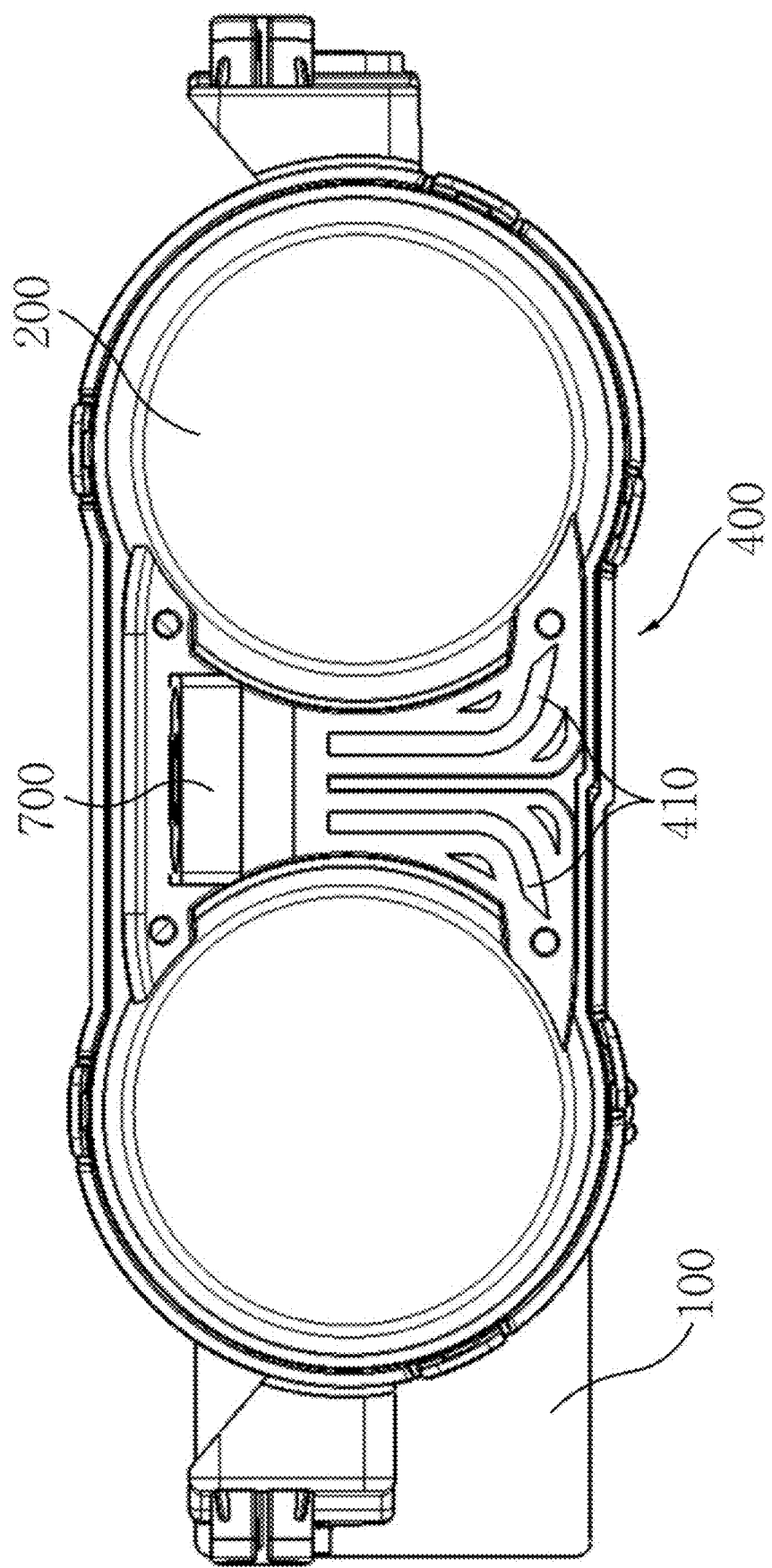
FIG. 2 is a plane view showing a state in which a radiation plate is installed in the heating and cooling holder for vehicles according to the present invention.
Figure 3:
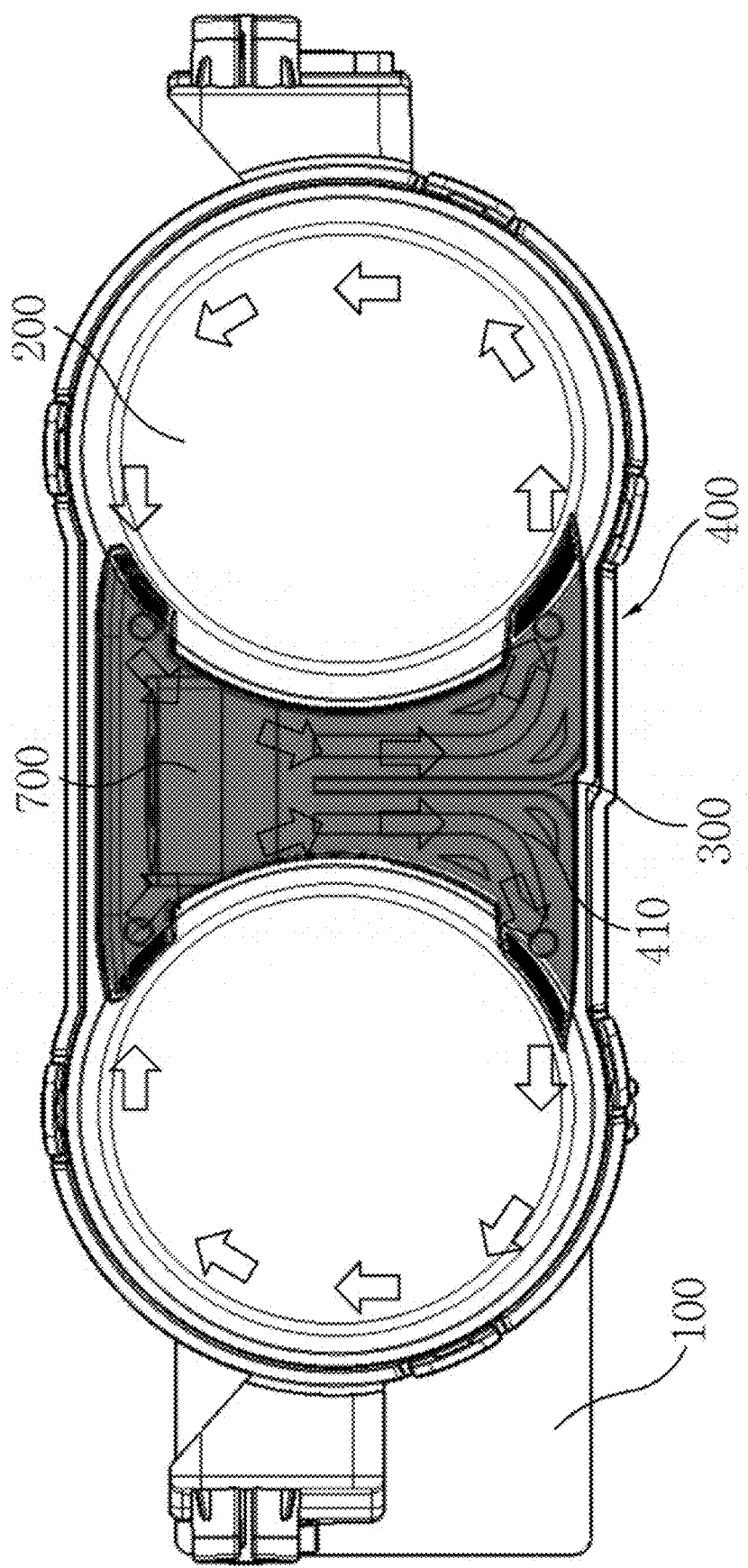
FIG. 3 is a drawing showing air circulation in the heating and cooling holder for vehicles according to the present invention.

FIG. 1 is an exploded perspective view showing the configuration of a heating and cooling holder for vehicles according to the present invention. FIG. 2 is a plane view showing a state in which a radiation plate is installed in the heating and cooling holder for vehicles according to the present invention. FIG. 3 is a drawing showing air circulation in the heating and cooling holder for vehicles according to the present invention.

As illustrated in FIGS. 1 to 3, the heating and cooling cup holder for vehicle according to the present invention is comprised of: a heat insulating cup 100 where a container accommodating part 110 is formed with an upper part opened so that a beverage container can be accommodated, a heat exchange cup 200 installed in the container accommodating part 110 formed in the heat insulating cup 100, a circulation duct 300 installed so that an air suction port 310 and an air exhaust port 320 are formed in the heat exchange cup 200, a circulation fan 700 that circulates air while introducing air into the heat exchange cup 200 through the air suction port 310 and the air exhaust port 320 formed in the circulation duct 300, a radiation plate 400 heat-exchanging the air introduced into the heat exchange cup 200 by the circulation fan 700 to re-supply to the heat exchange cup 200 through the circulation duct 300, and a thermoelectric element 600 installed so that the radiation plate 400 can absorb and generate heat.

Meanwhile, as illustrated in FIG. 1, a radiation fan 800 for discharging heat to the outside is installed at the radiation plate 400 where a thermoelectric element 600 is installed, such that when the radiation plate 400 absorbs heat by the thermoelectric element 600, it allows the radiation plate 400 to absorb heat while effectively discharging heat outside.

Further, the radiation plate 400 is installed in the heat insulating cup 100 in a state where the radiation plate 400 is fixedly coupled to a radiation duct 500 where a radiation fan 800 is installed on one side, such that the radiation plate 400 is not moved due to external force generated when the vehicle is in operation, maintaining the state of fixed installation and at the same time, air can be sufficiently conditioned through a heat exchange fin 410 installed inside the radiation plate 400.

A cover 900 is installed on the upper part of the heat insulating cup 100 where the heat exchange cup 200 is installed, so that the circulation duct 300 and the circulation fan 700 installed in the heat exchange cup 200 are not visible from the outside.

In addition, as shown in FIG. 2, the heat exchange fin 410 provided in the radiation plate 400 is bent to form a flow path, thus allowing a circulation, where air is introduced through an air suction port 310 formed in a circulation duct 300 and heat exchange is made and then it is smoothly re-supplied into the heat exchange cup 200 through the air exhaust port 320.

In the present invention configured as described above, the radiation plate 400 is fixedly installed at a bottom part of the heat-insulating cup in a state where the radiation plate 400 is fixedly coupled to a radiation duct 500 where a radiation fan 800 is installed on one side, and on a top surface of the radiation plate 400 that is fixedly installed in the radiation duct 500, a bottom surface of the heat exchange cup 200 is seated to be in contact, and an air suction port 310 and an air exhaust port 320 are formed in the heat exchange cup 200.

Meanwhile, a circulation fan 700 is operably installed on one side of the heat exchange cup 200 where the air suction port 310 of the circulation duct 300 is located.

After the radiation duct 500 and the radiation plate 400, and the heat exchange cup 200 and the circulation duct 300 are sequentially placed in the heat insulation cup 100 as described above, a cover 900 is coupled on the upper part of the heat insulating cup 100, so that the radiation duct 500 and the radiation plate 400, and the heat exchange cup 200 and the circulation duct 300 are not visible from the outside.

As a result, when the radiation plate 400 absorbs or generates heat by the thermoelectric element 600, heat or cold air generated in the radiation plate 400 is transferred to the heat exchange cup 200, and the heat transferred to the heat exchange cup 200 is then transferred to the contents in the container or cup accommodated in it.

At this time, as the air that has undergone heat exchange with the contents contained in the container or cup is discharged to the outside of the heat exchange cup 200 through the air suction port 310 formed in the circulation duct 300 by the operation of the circulation fan 700, it flows to the radiation plate 400. The air that has flown into the radiation plate 400 is re-supplied to the heat exchange cup 200 through the air exhaust port 320 formed in the circulation duct 300 after a heat exchange with the heat exchange fin 410, and thereby, heat exchange is made with the contents contained in the container or cup.

At this time, the air circulating through the air suction port 310 and the air exhaust port 320 flows through the space formed between the outer surface of the container or cup containing the contents and the inner circumferential surface of the heat exchange cup 200, and thereby, heat exchange is made with the contents contained in the container or cup.

Meanwhile, air flows through the space formed between the outer surface of the container or cup and the inner circumferential surface of the heat exchange cup 200, and because the heat exchange fin 410, which is provided in the radiation plate 400, is bent to form a plurality of flow paths, the air undergoing heat exchange with the contents contained in the container or cup goes through a circulation where the air is introduced along the flow paths through the air suction port 310 formed in the circulation duct 300 and heat exchange is made and then it is smoothly re-supplied into the heat exchange cup 200 through the air exhaust port 320.

In addition, waste heat generated due to the use of the thermoelectric element 600 is discharged outside of the radiation duct 500 by the radiation fan 800, thereby preventing waste heat from accumulating inside the radiation plate 400 and at the same time improving the cooling and heating performance of the cup holder.

EXPLANATION OF REFERENCE NUMERALS

100: heat-insulating cup
110: container accommodation part
200: heat exchange cup
300: circulation duct
310: air suction port
320: air exhaust port
400: radiation plate
500: radiation duct
600: thermoelectric element
700: circulation fan

The invention claimed is:

1. A heating and cooling cup holder for vehicles comprising:
   a heat insulating cup where a container accommodating part is formed with an upper part opened so that a beverage container can be accommodated,
   a heat exchange cup installed in the container accommodating part formed in the heat insulating cup,
   a circulation duct installed so that an air suction port and an air exhaust port are formed in the heat exchange cup,
   a circulation fan that circulates air while introducing air into the heat exchange cup through the air suction port and the air exhaust port formed in the circulation duct, wherein the circulation fan is installed on one side of the heat exchange cup where the air suction port of the circulation duct is located,
   a radiation plate heat-exchanging the air introduced into the heat exchange cup by the circulation fan to re-supply to the heat exchange cup through the circulation duct, and
   a thermoelectric element installed so that the radiation plate can absorb and generate heat;
   wherein a radiation fan for discharging heat to the outside is installed at the radiation plate where the thermoelectric element is installed, on the side of the radiation plate perpendicularly in a plane view to the side of the heat exchange cup on which the circulation fan is installed,
   wherein the radiation plate is installed in the heat insulating cup with the radiation fan in a state where it is fixedly coupled to a radiation duct, and
   wherein a heat exchange fin that is bent as an L-shape in the plane view to form a plurality of flow paths is installed inside the radiation plate.

2. A heating and cooling cup holder for vehicle according to claim 1, further comprising a cover installed on the upper part of the heat insulating cup where the heat exchange cup is installed.

* * * * *